United States Patent
Chen

(10) Patent No.: US 9,781,516 B2
(45) Date of Patent: Oct. 3, 2017

(54) TRANSPARENT ELECTRONIC SPEAKER DEVICE

(71) Applicant: IBASE TECHNOLOGY INC., Taipei (TW)

(72) Inventor: You-Nan Chen, Taipei (TW)

(73) Assignee: IBASE TECHNOLOGY INC., Taipei (TW)

( * ) Notice: Subject to any disclaimer, the term of this patent is extended or adjusted under 35 U.S.C. 154(b) by 0 days.

(21) Appl. No.: 14/862,968

(22) Filed: Sep. 23, 2015

(65) Prior Publication Data

US 2016/0316301 A1    Oct. 27, 2016

(30) Foreign Application Priority Data

Apr. 24, 2015   (TW) .............................. 104206288 U

(51) Int. Cl.
*H04R 1/02*        (2006.01)
*H04R 17/00*       (2006.01)
(Continued)

(52) U.S. Cl.
CPC ........... *H04R 17/00* (2013.01); *G06F 1/1643* (2013.01); *G06F 1/1688* (2013.01); *G06F 3/016* (2013.01);
(Continued)

(58) Field of Classification Search
CPC ................ H04R 1/403; H04R 2217/03; H04R 2201/023; H04R 25/405; H04R 17/00; H04R 17/005; H04R 2201/401; H04R 2225/55; H04R 25/554; H04R 27/00; H04R 7/04; H04R 1/06; H04R 31/006; H04R 1/025; H04R 1/026; H04R 2201/34; H04R 2400/11; H04R 2499/15; H04R 19/00; H04R 7/08; H04R 23/00; H04R 2400/03; H04R 3/002; H04R 7/045
USPC ......... 381/190, 396, 111, 150, 91, 398, 423, 381/431, 77, 94.1, 114, 120, 151, 173, 381/391, 399, 408, 98, 333, 191, 309, 381/332, 381, 306, 174
See application file for complete search history.

(56) References Cited

U.S. PATENT DOCUMENTS 9,426,580 B2 *   8/2016   Watanabe ............... H04R 7/045
2001/0002865 A1 *   6/2001   Lipponen ................ H04R 7/08
                                                    398/204
(Continued)

*Primary Examiner* — Akelaw Teshale
(74) *Attorney, Agent, or Firm* — Lin & Associates IP, Inc.

(57) ABSTRACT

Disclosed is a transparent electronic speaker device, including a transparent speaker, a touch control panel and a display panel which are sequentially stacked. The touch control panel provides a touch control function, and the display panel possesses a display function. The transparent speaker includes an upper conductive plate, a lower conductive plate and a transparent piezoelectric film sandwiched between the upper and lower conductive plates. The display panel generates and transfers a voltage driving signal through an electrical connection to the upper and lower conductive plates for actuating the transparent piezoelectric film to perform piezoelectric action, thereby generating vibration and sound. Therefore, the present invention not only integrates the functions of speaker, touch control and display, but also improves sound quality by use of the transparent piezoelectric film covering the whole electronic device without deteriorating display quality.

6 Claims, 2 Drawing Sheets

(51) Int. Cl.
*G06F 3/041* (2006.01)
*G06F 3/01* (2006.01)
*G06F 1/16* (2006.01)

(52) U.S. Cl.
CPC ............ *G06F 3/041* (2013.01); *G06F 3/0416* (2013.01); *H04R 2400/03* (2013.01); *H04R 2499/15* (2013.01)

(56) References Cited

U.S. PATENT DOCUMENTS

| | | | | |
|---|---|---|---|---|
| 2002/0171636 | A1* | 11/2002 | Aarts | G06F 3/0436 345/177 |
| 2005/0237685 | A1* | 10/2005 | Miyata | G02F 1/1362 361/91.1 |
| 2006/0239479 | A1* | 10/2006 | Schobben | H04M 1/0266 381/306 |
| 2011/0128245 | A1* | 6/2011 | Andoh | H04R 17/005 345/173 |
| 2011/0255718 | A1* | 10/2011 | Fukushima | H04R 17/00 381/190 |
| 2012/0032876 | A1* | 2/2012 | Tabe | H04B 1/3838 345/156 |
| 2012/0090902 | A1* | 4/2012 | Liu | G06F 3/045 178/18.03 |
| 2012/0162143 | A1* | 6/2012 | Kai | G06F 1/1626 345/177 |
| 2016/0050472 | A1* | 2/2016 | Lee | H04R 1/028 381/333 |

\* cited by examiner

TRANSPARENT ELECTRONIC SPEAKER DEVICE

CROSS-REFERENCE TO RELATED APPLICATION

This application claims the priority of Taiwanese patent application No. 104206288, filed on Apr. 24, 2015, which is incorporated herewith by reference.

BACKGROUND OF THE INVENTION

1. Field of the Invention

The present invention generally relates to a transparent electronic speaker device, and more specifically to a transparent electronic speaker device provided with a transparent piezoelectric film to generate vibration and sound due to piezoelectric action.

2. The Prior Arts

For electronic devices with an audio function such as radio sets, record players, television sets, tablets or mobile phones, and so on, it is needed to provide a speaker to generate sound as desired.

In the prior arts, the speaker commonly comprises an electrical coil, an electromagnet and a vibration film to form a resonance chamber. Roughly speaking, the frequency of the variable current flowing through the electrical coil is preferably within an audio range, and the magnetic field within the resonance chamber induced by the current is employed to interact with the electromagnet so as to generate the attractive and repulsive forces, which cause the vibration film attached to the electrical coil to vibrate and generate sound. The resonance chamber substantially amplifies the generated sound. Thus, the traditional speaker is designed to generate sound by mechanical vibration due to the attractive and repulsive forces.

While the sound generated by the above electromagnetic speaker exhibits high quality and the speaker is quite matured and cost effective, the whole volume is sometimes large, and in particular, the resonance chamber needs to be large enough to achieve sound quality. As for portable electronic players, such a large speaker adversely affects the texture and the outlook of the player, and is thus not suitable.

Moreover, the above speaker may shield or block part of the image played by video players unless the speaker is provided at some specific position not located along the path of the image. Most portable players are as large as palm at most, and have limited area for installing electronic components. As a result, the electrical design of the portable devices is a big challenge.

Therefore, it is greatly needed to provide a new electronic speaker device, which employs a transparent piezoelectric film instead of the traditional vibration film formed of paper, fabric or plastic to form a transparent electronic speaker device, and provides integrated functions of audio, video and touch control, thereby overcoming the above problems in the prior arts.

SUMMARY OF THE INVENTION

The primary objective of the present invention is to provide a transparent electronic speaker device, which comprises a transparent speaker and a touch control panel stacked together. The touch control panel has a touch control function, and the transparent speaker comprises an upper conductive plate, a lower conductive plate and a transparent piezoelectric film sandwiched between the upper and lower conductive plates. The touch control panel generates a voltage driving signal, which is transferred to the upper and lower conductive plates of the transparent speaker through an electrical connection such that the transparent piezoelectric film is actuated to generate vibration and sound.

The above transparent electronic speaker device provides the functions of speaker and touch control, and particularly, the whole surface of the electronic device is covered by the transparent speaker to enlarge the effective surface for generating sound and improve sound quality. The transparent speaker of the present invention may replace the traditional speaker, and the transparent electronic speaker device is thus applicable to music players such as portable touch control audio player or touch control mobile phone.

Another objective of the present invention is to provide a transparent electronic speaker device, which comprises a transparent speaker and a display panel with a display function, which are stacked together. Similarly, the transparent speaker comprises an upper conductive plate, a lower conductive plate and a transparent piezoelectric film sandwiched between the upper and lower conductive plates. The display panel generates a voltage driving signal transferred to the upper and lower conductive plates of the transparent speaker through an electrical connection so as to actuate the transparent piezoelectric film to generate vibration and sound. Thus, not only the functions of speaker and display are integrated in the transparent electronic speaker device, but also sound quality is greatly improved by the transparent speaker covering the whole electronic device without deteriorating display quality. The transparent electronic speaker device can replace the conventional speaker and is applicable to portable video game consoles, smart phones, notebook computers, and so on.

A yet objective of the present invention is to provide a transparent electronic speaker device, which comprises a transparent speaker, a touch control panel and a display panel sequentially stacked from top to bottom. Similarly, the touch control panel has the touch control function, and the display panel provides the image display function. Additionally, the transparent speaker comprises an upper conductive plate, a lower conductive plate and a transparent piezoelectric film sandwiched between the upper and lower conductive plates. The display panel generates the voltage driving signal, which is transferred to the upper and lower conductive plates through an electrical connection such that the transparent piezoelectric film is actuated to generate vibration and sound. Therefore, not only the transparent electronic speaker device integrates the functions of speaker, touch control and display to replace the commonly used speaker, but also sound quality is greatly improved by the transparent speaker, which covers the whole electronic device without deteriorating display quality. This transparent electronic speaker device is suitable for video applications enhanced by touch control, including portable touch control video game consoles, tablets, touch control smart phones, touch control notebook computers, and so on.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
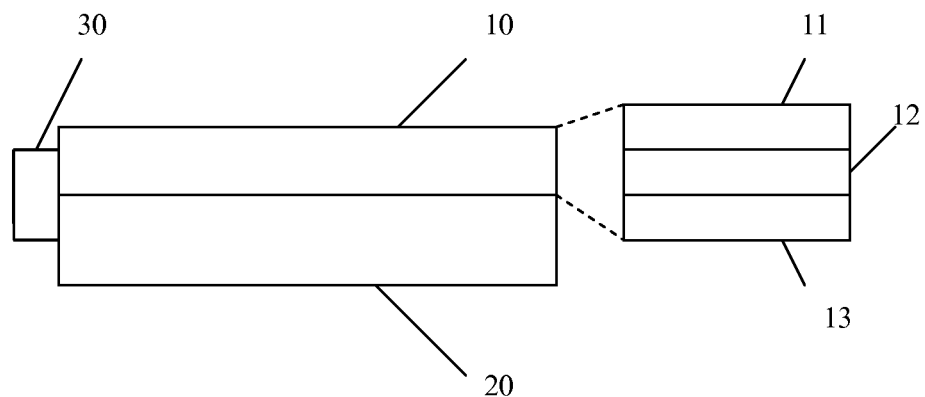
FIG. 1 is a view showing a transparent electronic speaker device according to the first embodiment of the present invention.

Please refer to FIG. 1 illustrating the transparent electronic speaker device according to the first embodiment of the present invention. As shown in FIG. 1, the transparent electronic speaker device of the first embodiment generally comprises a transparent speaker 10 and a touch control panel 20 stacked together. The transparent speaker 10 is an electrostatic speaker, and the touch control panel 20 has a touch control function.

Specifically, the transparent speaker 10 comprises an upper conductive plate 11, a transparent piezoelectric film 12 and a lower conductive plate 13, and the transparent piezoelectric film 12 is sandwiched between the upper and lower conductive plates 11 and 13 such that the transparent speaker 10 is a three-layer sandwich structure. In addition, the transparent piezoelectric film 12 is preferably a transparent plastic film.

The touch control panel 20 generates a voltage driving signal, which is transferred to the upper and lower conductive plates 11 and 13 of the transparent speaker 10 through an electrical connection 30. The transparent piezoelectric film 12 is actuated to generate vibration and sound.

Thus, the transparent electronic speaker device according to the first embodiment of the present invention provides the functions of speaker and touch control. In particular, the transparent speaker 10 covers the whole surface of the electronic device so as to enlarge the effective surface for generating sound and improve sound quality. The transparent speaker 10 of the present invention may replace the traditional speaker, and the transparent electronic speaker device of the first embodiment is applicable to music players such as portable touch control audio player or touch control mobile phone.

Figure 2:
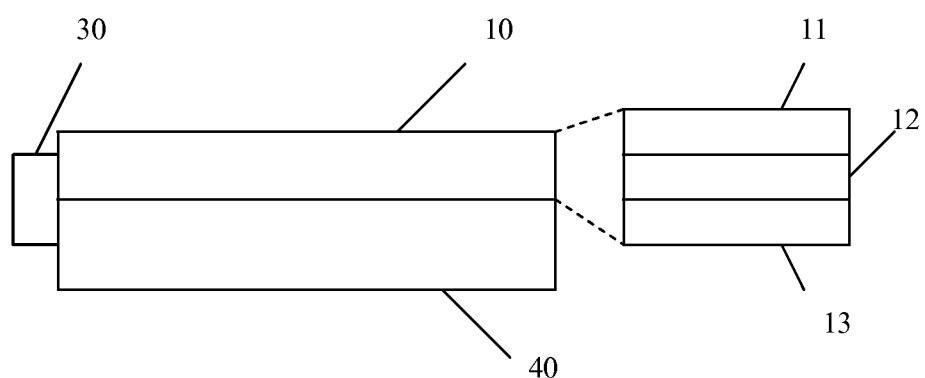
FIG. 2 is a view showing a transparent electronic speaker device according to the second embodiment of the present invention.

Further refer to FIG. 2 illustrating the transparent electronic speaker device according to the second embodiment of the present invention. As shown in FIG. 2, the transparent electronic speaker device of the second embodiment comprises a transparent speaker 10 and a display panel 40 stacked together. The display panel 40 has a display function. It should be noted that the transparent speaker 10 of the second embodiment is similar to the first embodiment in FIG. 1, and the detailed description is thus omitted.

The display panel 40 is a LCD (liquid crystal display panel) or an OLED (organic light-emitting diode) panel. Specifically, the image displayed by the display panel 40 is not blocked by the transparent speaker 10 such that the user may view the image on the transparent speaker 10, thereby implementing the display function. Furthermore, the display panel 40 generates and transfers the voltage driving signal to the upper and lower conductive plates 11 and 13 of the transparent speaker 10 through an electrical connection 30 so as to actuate the piezoelectric effect, thereby generating vibration and sound. Therefore, the second embodiment provides a function of generating sound.

The transparent electronic speaker device of the second embodiment not only integrates the functions of speaker and display, but also greatly improves sound quality by use of the transparent speaker 10 covering the whole electronic device without deteriorating display quality. Since the transparent piezoelectric film 12 can replace the traditional speaker of the video player, the transparent electronic speaker device of the second embodiment is applicable to portable video game consoles, smart phones, notebook computers, and so forth.

Figure 3:
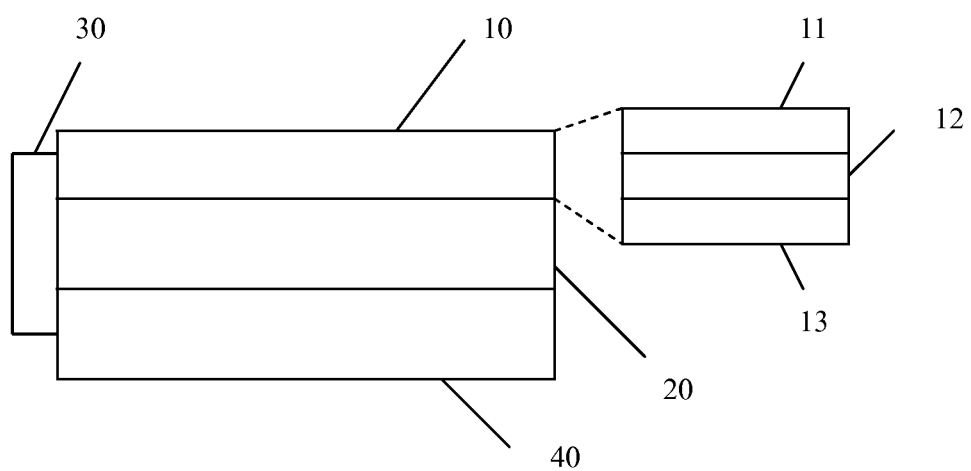
FIG. 3 is a view showing a transparent electronic speaker device according to the third embodiment of the present invention.

In addition, please refer to FIG. 3 illustrating the transparent electronic speaker device according to the third embodiment of the present invention. As shown in FIG. 3, the transparent electronic speaker device of the third embodiment comprises a transparent speaker 10, a touch control panel 20 and a display panel 40 stacked from top to bottom. Similar to the first or second embodiment, the transparent speaker 10 of the third embodiment comprises an upper conductive plate 11, a lower conductive plate 13 and a transparent piezoelectric film 12 sandwiched between the upper and lower conductive plates 11 and 13, the touch control panel 20 has the touch control function, and the display panel 40 provides the image display function. More specifically, the display panel 40 generates the voltage driving signal, which is transferred to the upper and lower conductive plates 11 and 13 of the transparent speaker 10 through an electrical connection 30 to actuate the transparent piezoelectric film 12 to generate vibration and sound.

Therefore, the transparent electronic speaker device of the third embodiment not only integrates the functions of speaker, touch control and display, but also greatly improves sound quality by use of the transparent speaker 10 covering the whole electronic device without deteriorating display quality. The third embodiment is applicable to portable touch control video game consoles, tablets, touch control smart phones, touch control notebook computers, etc.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A transparent electronic speaker device, comprising:
a transparent speaker comprising an upper conductive plate, a transparent piezoelectric film and a lower conductive plate, the transparent piezoelectric film having a piezoelectric function and being sandwiched between the upper and lower conductive plates, the upper and lower conductive plates receiving a voltage driving signal so as to actuate the transparent piezoelectric film to generate vibration and sound; and
a touch control panel having a touch control function, being attached to a lower surface of the transparent speaker,
wherein the touch control panel generates and transfers a voltage driving signal through an electrical connection to the upper and lower conductive plates of the transparent speaker.

2. The transparent electronic speaker device as claimed in claim 1, wherein the transparent speaker is an electrostatic speaker, and the transparent piezoelectric film is a transparent plastic film.

3. A transparent electronic speaker device, comprising:
a transparent speaker comprising an upper conductive plate, a transparent piezoelectric film and a lower conductive plate, the transparent piezoelectric film having a piezoelectric function and being sandwiched between the upper and lower conductive plates, the upper and lower conductive plates receiving a voltage driving signal so as to actuate the transparent piezoelectric film to generate vibration and sound; and
a display panel having a display function, being attached to a lower surface of the transparent speaker, the display panel being a liquid crystal display panel or an organic light-emitting diode panel, and the transparent speaker being transparent and not blocking the image displayed by the display panel;
wherein the display panel generates and transfers a voltage driving signal through an electrical connection to the upper and lower conductive plates of the transparent speaker.

4. The transparent electronic speaker device as claimed in claim 3, wherein the transparent speaker is an electrostatic speaker, and the transparent piezoelectric film is a transparent plastic film.

5. A transparent electronic speaker device, comprising:
a transparent speaker comprising an upper conductive plate, a transparent piezoelectric film and a lower conductive plate, the transparent piezoelectric film having a piezoelectric function and being sandwiched between the upper and lower conductive plates, the upper and lower conductive plates receiving a voltage driving signal so as to actuate the transparent piezoelectric film to generate vibration and sound;
a touch control panel having a touch control function, being attached to a lower surface of the transparent speaker; and
a display panel having a display function, being attached to a lower surface of the touch control panel, the display panel being a liquid crystal display panel or an organic light-emitting diode panel, and the transparent speaker being transparent and not blocking the image displayed by the display panel;
wherein the display panel generates and transfers a voltage driving signal through an electrical connection to the upper and lower conductive plates of the transparent speaker.

6. The transparent electronic speaker device as claimed in claim 5, wherein the transparent speaker is an electrostatic speaker, and the transparent piezoelectric film is a transparent plastic film.

* * * * *